United States Patent
Blumenberg et al.

(12)

(10) Patent No.: US 6,845,790 B2
(45) Date of Patent: Jan. 25, 2005

(54) EASILY PEELABLE SAUSAGE CASING MADE OF FIBRE-REINFORCED CELLULOSE HYDRATE HAVING A NON-STICK COATING ON THE INSIDE

(75) Inventors: Klaus Blumenberg, Walsrode (DE); Heinrich Henze-Wethkamp, Walsrode (DE); Willi Neuschulz, Bad Fallingbostel (DE)

(73) Assignee: CaseTech GmbH & Co. KG, Walsrode (DE)

( * ) Notice: Subject to any disclaimer, the term of this patent is extended or adjusted under 35 U.S.C. 154(b) by 0 days.

(21) Appl. No.: 10/630,084

(22) Filed: Jul. 30, 2003

(65) Prior Publication Data

US 2004/0084100 A1 May 6, 2004

(30) Foreign Application Priority Data

Aug. 6, 2002 (DE) ........................................ 102 35 966

(51) Int. Cl.[7] .............................................. F16L 11/00
(52) U.S. Cl. ..................... 138/118.1; 428/34.8; 426/92; 426/105; 426/138
(58) Field of Search .......................... 426/105, 92, 138; 138/118.1; 428/34.8

(56) References Cited

U.S. PATENT DOCUMENTS

| | | | | |
|---|---|---|---|---|
| 3,582,364 A | | 6/1971 | Rose et al. ................... 99/176 |
| 3,898,348 A | * | 8/1975 | Chiu et al. ................... 426/413 |
| 4,563,376 A | * | 1/1986 | Hammer et al. ......... 138/118.1 |
| 4,596,727 A | | 6/1986 | Higgens et al. ................ 428/36 |
| 5,419,962 A | * | 5/1995 | Robertson et al. .......... 428/34.8 |
| 5,595,769 A | | 1/1997 | Castner et al. ............... 425/183 |
| 5,595,796 A | * | 1/1997 | Hammer et al. ............ 428/34.8 |
| 6,703,058 B1 | * | 3/2004 | Hammer et al. ............. 426/135 |
| 2004/0043166 A1 | * | 3/2004 | Gopal ........................ 428/34.8 |

FOREIGN PATENT DOCUMENTS

| | | |
|---|---|---|
| DE | 28 53 269 | 6/1980 |
| DE | 34 47 026 | 7/1985 |
| DE | 199 16 121 | 10/2000 |
| EP | 0468284 | 1/1992 |

* cited by examiner

*Primary Examiner*—James Hook
(74) *Attorney, Agent, or Firm*—Joseph C. Gil; James R. Franks

(57) ABSTRACT

A fiber-reinforced sausage casing having a non-stick coating on its interior surface is described. In particular, the coating on the interior surface of the sausage casing includes the following four active components:

a chromium-fatty acid complex;
a fatty diketene;
a polyamine-polyamide-epichlorohydrin resin; and
a cellulose ether.

The weight ratio of (i) the chromium-fatty complex and diketene to (ii) the polyamine-polyamide-epichorohydrin resin is greater than or equal to 5:1. The sausage casing may be used to contain scalded-meat emulsion sausage, raw sausage and cooked ham.

4 Claims, No Drawings

EASILY PEELABLE SAUSAGE CASING MADE OF FIBRE-REINFORCED CELLULOSE HYDRATE HAVING A NON-STICK COATING ON THE INSIDE

CROSS REFERENCE TO RELATED PATENT APPLICATION

The present patent application claims the right of priority under 35 U.S.C. §119 (a)–(d) of German Patent Application No. 102 35 966.0, filed Aug. 6, 2002.

FIELD OF THE INVENTION

The invention relates to a sausage casing based on fiber-reinforced cellulose hydrate which has no adhesion to the filling, and to use thereof.

BACKGROUND OF THE INVENTION

Sausage casings having a coating on their inside to decrease the adhesion to the sausage are generally known in the art. Illustratively, DE-A-1 923 607 discloses a coating of three emulsion components A, B and C for decreasing adhesion to the sausage-meat emulsion and for avoiding fat separation. Component A is an aliphatic compound, inter alia an aliphatic dimeric ketene or aliphatic metal complex, for example stearate-chromium(III) chloride complex compound. Component B is an aliphatic compound having an HLB value of 1 to 10 and component C is a polyoxy ether of a higher aliphatic alcohol having an HLB value greater than 7 and a defined surface tension of less than 50 dyn/cm$^2$.

DE-A-3 447 026 proposes a coating for improving the peelability of the sausage casing that comprises a chromium-fatty acid complex compound and an oil, in particular a dimethylpolysiloxane. A further possible additive for increasing the separation effect is a cellulose ether, inter alia hydroxyethyl cellulose.

DE-A-2 853 269 relates to a cellulose casing having an inner coating of a water-soluble cellulose ether, inter alia hydroxyethyl cellulose, and a polyamine-polyamide-epichlorohydrin resin or a melamine formaldehyde resin. The latter compounds are customarily used to reinforce the adhesion. Thus a defined object thereof is setting a good adhesion of the cellulose casing to the food mixture.

DE-A 19 916 121 describes a cellulose-hydrate-based food casing which is impregnated on its inner surface with a non-stick preparation. This preparation comprises a reactive hydrophobizing compound and a non-reactive non-stick component and also an oil and/or lecithin component. The reactive hydrophobizing component is preferably a chromium-fatty acid complex, a diketene having long-chain alkyl residues, an alkyl isocyanate, or a reactive silicone. The non-reactive non-stick component is preferably a cellulose ether, inter alia hydroxyethyl cellulose. The components are said to cause a separation effect in a synergistic manner.

EP-A-0 676 143 discloses a cellulose-hydrate-based food casing which is impregnated internally with a mixture which comprises an adhesion component and a non-stick component. The adhesion component can be a polyamine-polyamide-epichlorohydrin resin and the non-stick component can be a chromium-fatty acid complex or a diketene having long-chain, fatty substituents. The purpose here is to set a defined, not too weak adhesion for producing raw sausage which shrinks due to water release, during which the casing shall not detach.

Although said coatings improve the peelability, they cannot reduce the strong adhesion forces between cellulose casing and sausage, in particular in the case of lean sausage varieties, to the extent that peeling is made possible without significant expenditure of force.

It is therefore an object of this invention to find an inner coating for a fiber-reinforced cellulose-hydrate-based sausage casing, which coating makes possible easy peel of the sausage casing from the sausage mixture.

SUMMARY OF THE INVENTION

The invention therefore relates to a fiber-reinforced cellulose-hydrate-based tubular sausage casings, which has on the inner surface a coating for easier peelability from the sausage mixture, which coating comprises four active components: chromium-fatty acid complex, fatty diketene, polyamine-epichlorohydrin resin and cellulose ether.

The sausage casing of the invention having the coating on the inner surface exhibits a markedly decreased adhesion to the sausage mixture, also termed the easy peel effect, with the combination of the four components chromium-fatty acid complex, fatty diketene, polyamine-polyamide-epichlorohydrin resin and cellulose ether. This effect of the four components is particularly surprising, because the adhesion in each case markedly increases when one of the components is omitted from the coating. Together the four components in the coating cause a synergistic effect of low adhesion of the casing to the sausage mixture. The synergistic effect is rather unpredictable given that the component, polyamine-polyamide-epichlorohydrin resin is known for use in inner coatings of sausage casings to impart adhesion-reinforcing action. Therefore, the use thereof in the combination with chromium-fatty acid complex, fatty diketene and hydroxyethyl cellulose to impart adhesion-decreasing action is surprising and not predictable.

DETAILED DESCRIPTION OF THE INVENTION

The sausage casing comprises a cellulose-hydrate-based tube which has on the inside a coating to improve the peelability. The casing is reinforced with a fiber web, which preferably consists of hemp fibers. The sausage casing is produced in a known manner, with the web material which has been shaped to form the tube being coated with viscose and regenerated in customary acid-containing precipitation baths to give fiber-reinforced cellulose hydrate. The coating of the invention is applied to the inside of the tubular casing in a customary manner by filling the cellulose hydrate casing, typically with a coating liquid between the precipitation process and drying.

According to the invention the active components are present in the coating liquid. The component chromium-fatty acid complex is a complex compound of fatty acids having 12 to 18 carbon atoms, for example stearic acid, with chromium chloride. That which is preferably used is the product ®Umbrellit S 30 from Münzing Chemie GmbH.

The component fatty diketene comprises long-chain (C10–C18) fatty acids, which is particularly highly suitable. These diketenes are generally prepared from naturally occurring fatty acids. Preference is given to diketenes which contain 12 to 16 carbon atoms. Particular preference as diketene component is given to the product Aquapel E6098 from Hercules.

The active component polyamine-polyamide-epichlorohydrin resin is a commercial, conventional wetstrength composition which is also used in the paper industry and is safe for health according to recommendation 44, synthetic casings, of the German Federal Institute for Consumer Health Protection and Veterinary Medicine. Of the commercially available types, preference is given to ®Kymene SLX from Hercules.

The component cellulose ether is preferably a hydroxyethyl cellulose, in particular the low-viscosity type ®Cellosize QP3L from Union Carbide.

To achieve the pronounced easy-peel effect, the weight ratio of the component chromium-fatty acid complex and diketene to the component polyamine-polyamide-epichlorohydrin resin (PPE) is to be greater than or equal to 5:1, with the higher ratio being determinable by the skilled artisan based on the teachings herein.

The amount of the coating applied can be varied according to the surface roughness of the sausage casings in order to achieve a uniform coating. The application rate is 130 to 1 590 mg/m$^2$, preferably 170 to 1 380 mg/m$^2$.

The invention further relates to the use of the said sausage casings for producing scalded-emulsion sausage, raw sausage and cooked ham.

Illustratively, the internal surface was treated with impregnating solutions containing all four active components.

On account of the pronounced easy-peel effect, the inventive sausage casing is suitable for producing lean, protein-rich sausage varieties, such as, particularly, scalded-emulsion sausage and cooked ham.

The invention is described in more detail by the non-limiting examples below.

EXAMPLES

The comparative Examples 1 to 4 each show the adhesion effect when one of the four components of Claim 1 is omitted, while Example 1 verifies the synergistic effect in the case of combined use of all of the four substances.

The figures for the substances represent the number of grams of the substances used in the impregnating solution. The chromium-fatty acid complex ®Umbrellit S30, manufacturer Münzing Chemie GmbH, has an active compound content of 30%, the diketene ®Aquapel E 6098, manufacturer Hercules, contains 21.7% active compound, the hydroxyethyl cellulose ®Cellosize QP 3L, manufacturer Union Carbide, is used as a solution having a solids content of 5%, and the polyamine-polyamide-epichlorohydrin resin ®Kymene SLX, manufacturer Hercules, contains 13% active compound. The sausage casing samples produced are stuffed with scalded-emulsion sausage and are evaluated after 2 days for their peelability. Emulsion adhesion is rated on a scale of 0 to 5 of increasing adhesion of the casing to the sausage.

Comparative Examples 1 to 4

In the continuous production of a fiber casing skin viscose-treated on both sides of nominal caliber 80, the inner surface was treated with impregnation solutions of the following compositions.

| C1 | C2 | C3 | C4 | Substances in the impregnating solution |
|---|---|---|---|---|
| 3732 | 2930 | 2622 | 2530 | Water |
| 240 | 180 | 240 | — | ® Umbrellit S30 |
| 330 | 250 | — | 332 | ® Aquapel E 6098 |
| — | 1080 | 1440 | 1440 | ® Cellosize QP 3L |
| 138 | — | 138 | 138 | ® Kymene SLX |
| 560 | 560 | 560 | 560 | Glycerol |
| 0.35 | 0.5 | 0.5 | 1.5 | Emulsion adhesion |

Example 1

The sample of this example containing the four active components was produced in the same manner as the comparative examples.

| | Substances in the impregnating solution |
|---|---|
| 2947 | Water |
| 167 | ® Umbrellit S30 |
| 230 | ® Aquapel E 6098 |
| 1000 | ® Cellosize QP 3L |
| 96 | ® Kymene SLX |
| 560 | Glycerol |
| 8:1 | Ratio of Umbrellit + Aquapel:Kymene |
| 0.25 | Emulsion adhesion |

Examples 2 to 5

In the continuous production of a fiber skin viscose-treated on both sides of nominal caliber 65, the internal surface was treated with impregnating solutions containing all four active components according to Claim 1 of the following compositions.

| 2 | 3 | 4 | 5 | Substances in the impregnating solution |
|---|---|---|---|---|
| 3486 | 2652 | 2979 | 2916 | Water |
| 167 | 200 | 250 | 83 | ® Umbrellit S30 |
| 345 | 92 | 115 | 345 | ® Aquapel E 6098 |
| 250 | 1400 | 1000 | 1000 | ® Cellosize QP 3L |
| 192 | 96 | 96 | 96 | ® Kymene SLX |
| 560 | 560 | 560 | 560 | Glycerol |
| 5:1 | 6,4:1 | 8:1 | 8:1 | Ratio of Umbrellit + Aquapel:Kymene |
| 0.25 | 0.5 | 0.25 | 0.5 | Emulsion adhesion |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A fiber-reinforced cellulose-hydrate-based tubular sausage casing, which on the inner surface, for easy peelability from the sausage mixture, has a coating comprising four active components:

a chromium-fatty acid complex;

a fatty diketene;

a polyamine-polyamide-epichlorohydrin resin; and a cellulose ether, wherein said sausage casing has a weight ratio of (i) said chromium-fatty complex and said diketene to (ii) said polyamine-epichorohydrin resin that is greater than or equal to 5:1.

2. The sausage casing of claim 1 wherein the cellulose ether is hydroxyethyl cellulose.

3. The sausage casing of claim 1 wherein the total amount of internal coating applied is 130 to 1590 mg/m$^2$.

4. A process for producing scalded-meat emulsion sausage, raw sausage and cooked ham comprising providing the sausage casing according to claim 1.

* * * * *